US012020835B2

(12) United States Patent
Kim et al.

(10) Patent No.: US 12,020,835 B2
(45) Date of Patent: Jun. 25, 2024

(54) MANUFACTURING METHOD OF SINTERED MAGNET

(71) Applicant: LG Chem, Ltd., Seoul (KR)

(72) Inventors: Tae Hoon Kim, Daejeon (KR); Soon Jae Kwon, Daejeon (KR); Ikjin Choi, Daejeon (KR); Ingyu Kim, Daejeon (KR); Eunjeong Shin, Daejeon (KR); Seung Ho Moon, Daejeon (KR); Jakyu Chun, Daejeon (KR)

(73) Assignee: LG Chem, Ltd., Seoul (KR)

( * ) Notice: Subject to any disclaimer, the term of this patent is extended or adjusted under 35 U.S.C. 154(b) by 528 days.

(21) Appl. No.: 17/289,973

(22) PCT Filed: Oct. 7, 2020

(86) PCT No.: PCT/KR2020/013684
§ 371 (c)(1),
(2) Date: Apr. 29, 2021

(87) PCT Pub. No.: WO2021/075787
PCT Pub. Date: Apr. 22, 2021

(65) Prior Publication Data

US 2021/0407712 A1 Dec. 30, 2021

(30) Foreign Application Priority Data

Oct. 16, 2019 (KR) ........................ 10-2019-0128749

(51) Int. Cl.
*H01F 1/057* (2006.01)
*B22F 3/10* (2006.01)
(Continued)

(52) U.S. Cl.
CPC .......... *H01F 1/0577* (2013.01); *B22F 3/1003* (2013.01); *B22F 3/24* (2013.01);
(Continued)

(58) Field of Classification Search
CPC ................. H01F 1/057–05778; H01F 41/0293
See application file for complete search history.

(56) References Cited

U.S. PATENT DOCUMENTS 6,468,365 B1 10/2002 Uchida et al.
9,272,332 B2 3/2016 Becker et al.
(Continued)

FOREIGN PATENT DOCUMENTS

CN 1261717 A 8/2000
CN 103310971 A 9/2013
(Continued)

OTHER PUBLICATIONS

Li W.F.; et al.; "Microstructure of Sintered Nd—Fe—Ga—B magnets with Mo and MoS2 addition"; J. of Magnetism and Magnetic Materials; 324, 2012, pp. 1391-1396 (Year: 2012).*
(Continued)

*Primary Examiner* — Alexandra M Moore
*Assistant Examiner* — Austin Pollock
(74) *Attorney, Agent, or Firm* — Lerner David LLP

(57) ABSTRACT

A method for manufacturing a sintered magnet according to one embodiment of the present disclosure is provided. The method includes producing an R-T-B-based magnetic powder through a reduction-diffusion method, and sintering the R-T-B-based magnetic powder, wherein R is a rare earth element, and T is a transition metal, and wherein the producing the magnetic powder includes adding a refractory metal sulfide powder to a R-T-B-based raw material.

9 Claims, 3 Drawing Sheets

(51) Int. Cl.

| | |
|---|---|
| ***B22F 3/24*** | (2006.01) |
| ***C22C 1/05*** | (2023.01) |
| ***H01F 41/02*** | (2006.01) |

(52) U.S. Cl.

CPC ........... *C22C 1/058* (2013.01); *H01F 1/0576* (2013.01); *H01F 41/0266* (2013.01); *H01F 41/0293* (2013.01); *B22F 2301/355* (2013.01); *B22F 2998/10* (2013.01); *C22C 2202/02* (2013.01)

(56) References Cited

U.S. PATENT DOCUMENTS

| | | | | |
|---|---|---|---|---|
| 10,347,418 | B2 | 7/2019 | Sakuma et al. | |
| 2002/0144754 | A1 | 10/2002 | Tokoro et al. | |
| 2015/0251248 | A1 | 9/2015 | Becker et al. | |
| 2016/0086704 | A1 | 3/2016 | Namkung et al. | |
| 2016/0260530 | A1 | 9/2016 | Yue et al. | |
| 2016/0314899 | A1* | 10/2016 | Sakuma | H01F 41/0266 |
| 2018/0182517 | A1* | 6/2018 | Luo | C22C 33/0278 |
| 2018/0350520 | A1 | 12/2018 | Li | |
| 2020/0203068 | A1 | 6/2020 | Choi et al. | |

FOREIGN PATENT DOCUMENTS

| | | | | |
|---|---|---|---|---|
| CN | 104690270 | A | 6/2015 | |
| CN | 105355412 | A | 2/2016 | |
| CN | 105761860 | A | 7/2016 | |
| CN | 105830178 | A | 8/2016 | |
| CN | 108155004 | A * | 6/2018 | |
| CN | 108220732 | A | 6/2018 | |
| EP | 1005050 | A2 | 5/2000 | |
| EP | 3090821 | A1 * | 11/2016 | B22F 1/0003 |
| JP | H3198304 | A | 8/1991 | |
| JP | H7283016 | A | 10/1995 | |
| JP | H8316014 | A | 11/1996 | |
| JP | H11251123 | A | 9/1999 | |
| JP | 2000223306 | A | 8/2000 | |
| JP | 2005179773 | A | 7/2005 | |
| JP | 2006187775 | A | 7/2006 | |
| JP | 20199313 | A | 1/2019 | |
| KR | 20000029088 | A | 5/2000 | |
| KR | 20120116116 | A | 10/2012 | |
| KR | 20150033423 | A | 4/2015 | |
| KR | 20160087856 | A | 7/2016 | |
| KR | 2018004479 | A * | 1/2018 | B22F 3/12 |
| KR | 20180004476 | A | 1/2018 | |
| KR | 20180004479 | A | 1/2018 | |
| KR | 101837279 | B1 | 3/2018 | |
| KR | 20180096334 | A | 8/2018 | |
| KR | 20190062187 | A | 6/2019 | |
| WO | 2019007499 | A1 | 1/2019 | |
| WO | 2019107929 | A1 | 6/2019 | |

OTHER PUBLICATIONS

International Search Report for Application No. PCT/KR2020/013684, dated Feb. 2, 2021, 3 pages.

Kyoung-Hoon Bae et al., "Effect of WS2/Al Co-Doping on Microstructural and Magnetic Properties of Nd—Fe—B Sintered Magnets", Journal of Alloys and Compounds, available online Mar. 2016, pp. 321-326, vol. 673, Science Direct; URL: https://www.sciencedirect.com/science/article/pii/S0925838816305801.

Extended European Search Report including Written Opinion for Application No. 20875655.1 dated Dec. 10, 2021, pp. 1-11.

Principles and Processes of Powder Metallurgy, Metallurgical Industry Press, May 2013, pp. 241-242. (See CN OA issued Mar. 27, 24 provided herewith for concise explanation of relevance.).

Office Action for Chinese Application No. 202080006091.3 issued Mar. 27, 2024 including Search Report dated Mar. 26, 2024. 8 pgs.

* cited by examiner

【FIG. 1】
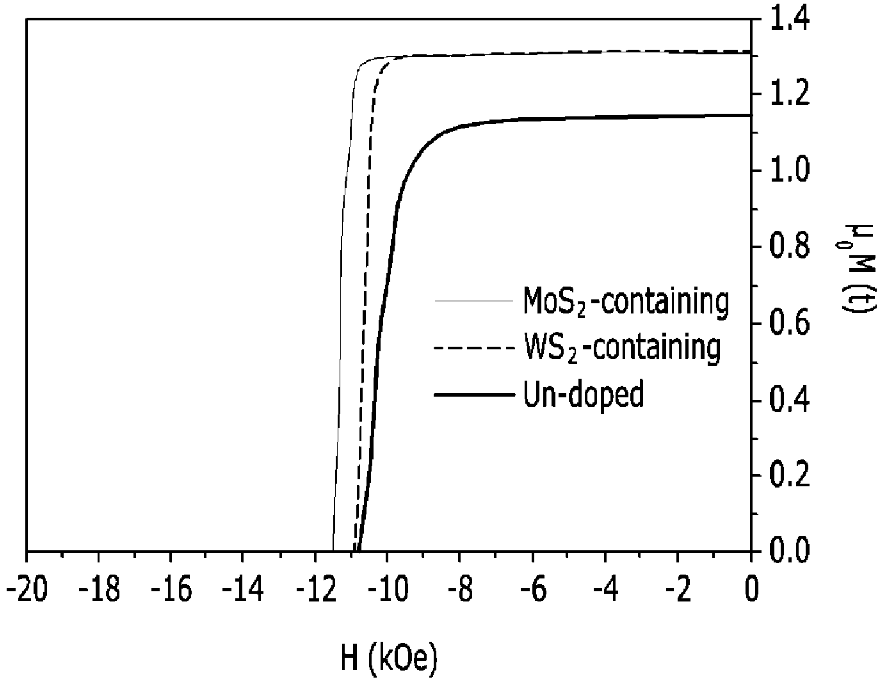
【FIG. 2】
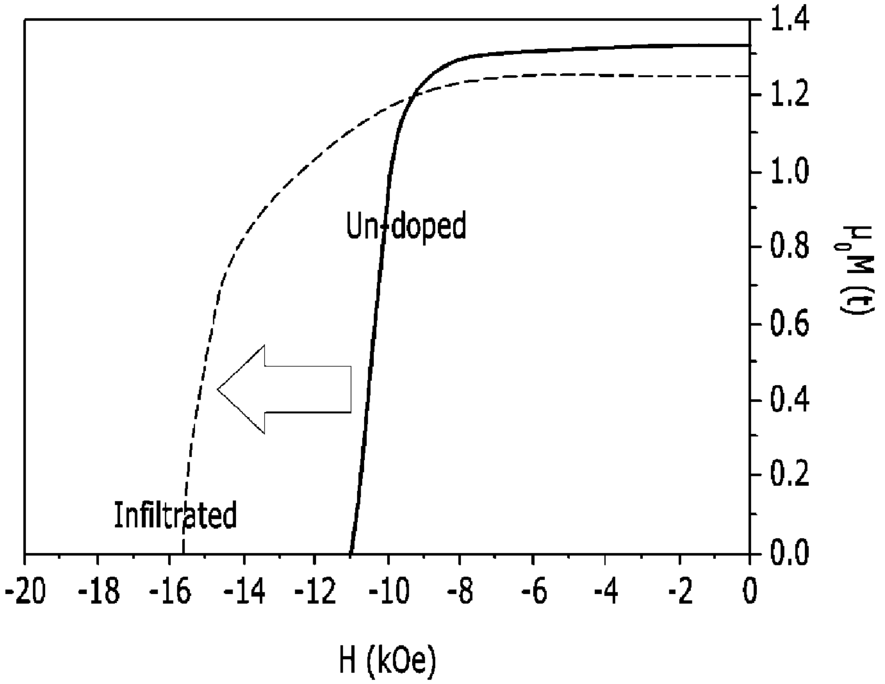

【FIG. 3】
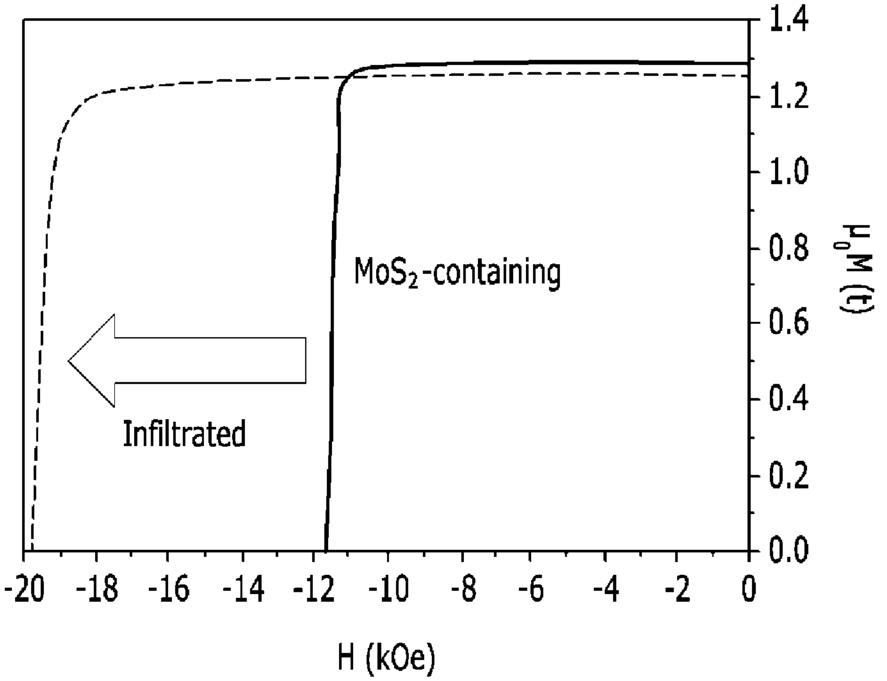
【FIG. 4】
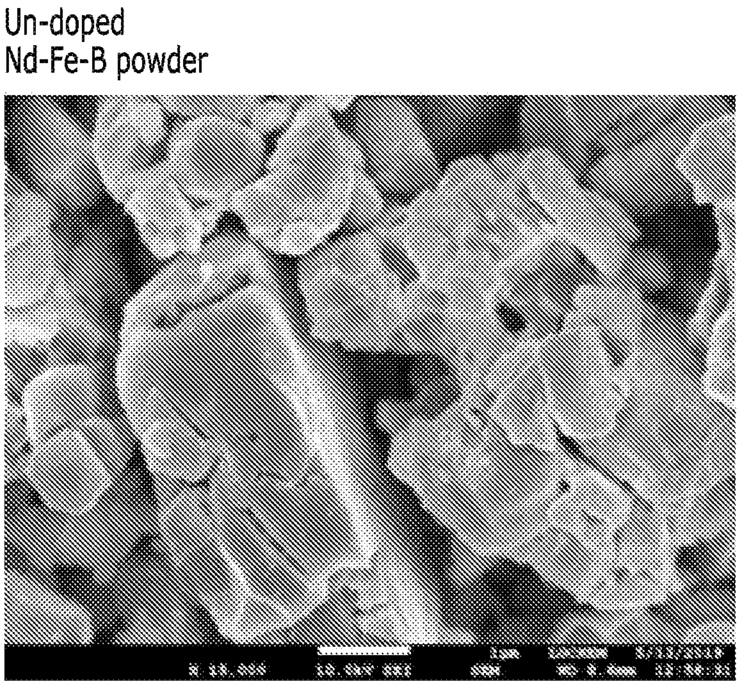

【FIG. 5】
$MoS_2$-containing
Nd-Fe-B powder
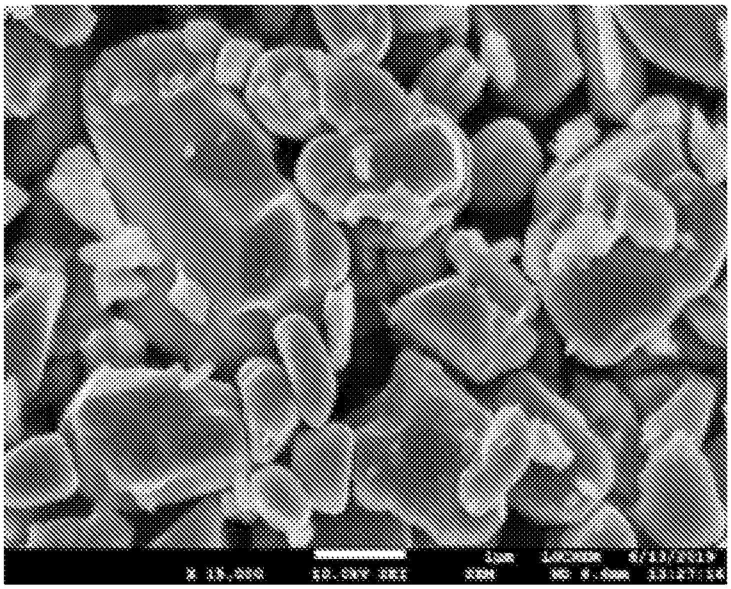
【FIG. 6】
$WS_2$-containing
Nd-Fe-B powder
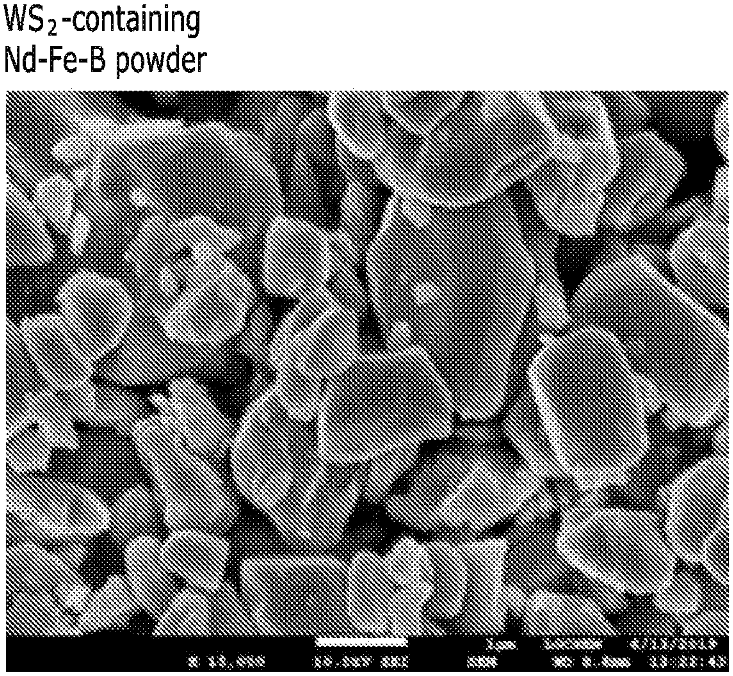

MANUFACTURING METHOD OF SINTERED MAGNET

CROSS REFERENCE TO RELATED APPLICATION

This application is a national phase entry under 35 U.S.C. § 371 of International Application No. PCT/KR2020/013684 filed on Oct. 7, 2020, which claims priority from Korean Patent Application No. 10-2019-0128749 filed on Oct. 16, 2019 with the Korean Intellectual Property Office, the disclosure of which are incorporated herein by reference in their entirety.

TECHNICAL FIELD

The present disclosure relates to a method of manufacturing a sintered magnet, and more particularly, to a method of manufacturing an R—Fe—B-based sintered magnet.

BACKGROUND ART

NdFeB-based magnets are permanent magnets having a composition of $Nd_2Fe_{14}B$ which is a compound of neodymium (Nd), a rare earth element, and iron and boron (B), and have been used as general-purpose permanent magnets for 30 years since there are developed in 1983. The NdFeB-based magnets are used in various fields such as electronic information, automobile industry, medical equipment, energy, and transportation. In particular, in line with recent trends in weight reduction and miniaturization, they are used in products such as machine tools, electronic information devices, electronic products for home appliances, mobile phones, robot motors, wind power generators, small motors for automobiles, and driving motors.

For the general preparation of NdFeB-based magnets, a strip/mold casting or melt spinning method based on a metal powder metallurgy method is known. First, the strip/mold casting method is a process in which metals such as neodymium (Nd), iron (Fe), boron (B) are melted by heating to produce an ingot, crystal grain particles are coarsely pulverized and subjected to a refinement process to produce microparticles. These steps are repeated to obtain a magnet powder, which is subjected to a pressing and sintering process under a magnetic field to produce an anisotropic sintered magnet.

In addition, the melt spinning method is a process in which metal elements are melted, then poured into a wheel rotating at a high speed, rapidly cooled, pulverized by a jet mill, then blended with a polymer to form a bonded magnet, or pressed to produce a magnet.

However, all of these methods have problems that a pulverization process is essentially needed, it takes a long time in the pulverization process, and a process of coating the surface of the powder after pulverization is needed. Further, since the existing $Nd_2Fe_{14}B$ microparticles are produced by melting the raw material (1500-2000° C.) and quenching it, subjecting the obtained lump to coarse pulverization, and hydrogen crushing/jet mill multi-step treatment, the particle shape is irregular and there is a limit to the miniaturization of particles.

Recently, attention has been paid to the method of producing a magnet powder by a reduction-diffusion process. For example, uniform NdFeB fine particles can be produced through a reduction-diffusion process in which $Nd_2O_3$, Fe, and B are mixed and reduced with Ca or the like.

However, in the case of the process of sintering magnetic powder produced by the reduction-diffusion method to obtain a sintered magnet, when sintering is performed in a temperature range of 1000 to 1250 degrees Celsius, it is accomplished by the growth of crystal grain. The growth of these crystal grains acts as a factor for reducing the coercive force. The relationship between the crystal grain size and the coercive force has been clarified experimentally as shown in Equation 1.

$$HC=a+b/D \text{(where } HC\text{: magnetic moment,} a \text{ and } b\text{: constant,} D\text{: crystal grain size)} \quad \text{[Equation 1]}$$

According to Equation 1, the coercive force of the sintered magnet tends to decrease as the crystal grain size increases. In addition, during sintering, the grain growth (more than 1.5 times the initial powder size) and the abnormal grain growth (more than twice the general grain size) occur during sintering, which is significantly reduced than the theoretical coercive force that the initial powder can have.

Therefore, the method for suppressing the growth of crystal grains during sintering includes HDDR (hydrogenation, disproportionation, desorption and recombination) process, a method of reducing the size of the initial powder through jet mill grinding, and a method of forming a triple junction phase by adding an element capable of forming a secondary phase, thereby suppressing the movement of crystal grain boundaries.

However, the coercive force of the sintered magnet can be secured to some extent through the various methods described above, but the process itself is very complicated, and the effect on the suppression of the grain growth during sintering is still insufficient. In addition, the microstructure is greatly changed due to the movement of the crystal grain or the like, which causes other problems such as a decrease in the characteristics of the sintered magnet and a decrease in the magnetic characteristics due to an additional element.

DETAILED DESCRIPTION OF THE INVENTION

Technical Problem

Embodiments of the present disclosure has been designed to solve that above-mentioned problems, and an object of the present disclosure is to provide a method for manufacturing a sintered magnet that improves the magnetic properties and squareness ratio of the sintered magnet.

However, the problem to be solved by embodiments of the present disclosure is not limited to the above-described problems, and can be variously expanded within the scope of the technical idea included in the present disclosure.

Technical Solution

A method for manufacturing a sintered magnet according to one embodiment of the present disclosure includes the steps of: producing an R-T-B-based magnetic powder through a reduction-diffusion method; and sintering the R-T-B-based magnetic powder, wherein the R is a rare earth element, and the T is a transition metal, and wherein the step of producing the magnetic powder includes a step of adding a refractory metal sulfide powder to the R-T-B-based raw material.

In the step of producing the magnetic powder, the refractory metal sulfide may be reduced to form a high-melting point metal precipitate.

In the step of sintering the magnetic powder, the magnetic powder may be sintered in the presence of the high-melting point metal precipitate.

The step of sintering the magnetic powder may include a step of adding a rare earth hydride powder to the magnet powder.

The rare earth hydride powder may include at least one of $NdH_2$, $PrH_2$, $DyH_2$ or $TbH_2$.

The method for manufacturing a sintered magnet may further include the steps of:

producing an eutectic alloy containing Pr, Al, Cu, and Ga; and infiltrating the eutectic alloy to the sintered magnet.

The infiltration step may include the steps of applying the eutectic alloy to the sintered magnet, and heat-treating the sintered magnet to which the eutectic alloy is applied.

The step of producing the eutectic alloy may include the steps of mixing $PrH_2$, Al, Cu and Ga to prepare an eutectic alloy mixture, pressing the eutectic alloy mixture by a cold isostatic pressing method, and heating the pressed eutectic alloy mixture.

The step of producing the R-T-B-based magnetic powder may include a step of mixing a rare earth oxide, iron, boron, and a reducing agent, followed by heating.

The reducing agent may include at least one of Ca, $CaH_2$ or Mg.

The R-T-B-based magnetic powder may include a magnet powder in which the R is Nd, Pr, Dy or Tb, and the T is Fe.

The refractory metal sulfide powder may include at least one of $MoS_2$ or $WS_2$.

Advantageous Effects

According to the embodiments of the present disclosure, when a R-T-B magnet powder is synthesized using the reduction-diffusion method, the precipitation of the high-melting point metal can be induced by adding the high-melting point metal sulfide powder, whereby the particle size of the synthesized magnet powder itself can be miniaturized, the homogeneity of the particles is improved, and at the same time, normal and abnormal grain growth can be suppressed during the sintering process. Therefore, the magnetic characteristics and squareness ratio of the manufactured sintered magnet can be improved.

BRIEF DESCRIPTION OF THE DRAWINGS

FIG. 1 is a BH graph showing magnetic flux density (Y-axis) according to the coercive force (X-axis) measured in sintered magnets manufactured according to Comparative Example 1, Example 1, and Example 2, respectively.

FIG. 2 is a B—H measurement graph of the sintered magnet before and after infiltration step in the process of manufacturing the sintered magnet according to Comparative Example 1.

FIG. 3 is a B—H measurement graph of the sintered magnet before and after infiltration step in the process of manufacturing the sintered magnet according to Example 3.

FIG. 4 is a scanning electron microscope image of a sintered magnet manufactured according to Comparative Example 1.

FIG. 5 is a scanning electron microscope image of a sintered magnet manufactured according to Example 1.

FIG. 6 is a scanning electron microscope image of a sintered magnet manufactured according to Example 2.

DETAILED DESCRIPTION OF THE EMBODIMENTS

Hereinafter, various embodiments of the present disclosure will be described in detail so that those skilled in the art can easily implement them. The present disclosure may be modified in various different ways, and is not limited to the embodiments set forth herein.

Further, throughout the specification, when a portion is referred to as "including" a certain component, it means that it can further include other components, without excluding the other components, unless otherwise stated.

A method for manufacturing a sintered magnet according to one embodiment of the present disclosure includes the steps of: producing an R-T-B-based magnetic powder through a reduction-diffusion method; sintering the R-T-B-based magnetic powder, wherein the R is a rare earth element, and the T is a transition metal, and wherein the step of producing the magnetic powder includes a step of adding a refractory metal sulfide powder to the R-T-B-based raw material.

R in the R-T-B-based magnet powder refers to a rare earth element, and may be Nd, Pr, Dy, or Tb. That is, R described below means any one of Nd, Pr, Dy, and Tb. T in the R-T-B-based magnet powder refers to a transition metal, and T described below may be Fe. At this time, a trace amount of Co, Cu, Al, Ga, etc. may be replaced with Fe and added to T.

In the present embodiment, the R-T-B-based magnetic powder is produced through a reduction-diffusion method. The reduction-diffusion method is a method in which rare earth oxides, iron, boron, and a reducing agent are mixed and heated to reduce the rare earth oxides and at the same time, synthesize a magnetic powder on $R_2Fe_{14}B$. At this time, according to the present embodiment, $MoS_2$ or $WS_2$ may be added in the process of synthesizing the magnetic powder.

The rare earth oxide may include at least one of $Nd_2O_3$, $Pr_2O_3$, $Dy_2O_3$ or $Tb_2O_3$ in correspondence with the rare earth element R. Because the reduction-diffusion method uses rare earth oxides as raw materials, the cost is high and a separate pulverization process such as coarse pulverization, hydrogen grinding, or jet mill, or surface treatment process is not required.

Further, in order to improve the magnetic performance of the sintered magnet, it is essential to miniaturize the crystal grains of the sintered magnet. The crystal grain size of the sintered magnet is directly related to the size of the initial magnet powder. In this case, the reduction-diffusion method has an advantage in that it is easier to produce a magnetic powder having fine magnetic particles as compared with other methods.

However, in the case of sintering the magnetic powder produced by the reduction-diffusion method, in the process of sintering, the crystal grain growth (more than 1.5 times the size of the initial powder) or abnormal grain growth (more than twice the size of the normal grain size) may occur. Thus, there is a problem that the grain size distribution of the sintered magnet is not uniform and magnetic performance such as coercive force is deteriorated. In particular, in the case of abnormal grain growth, it causes both the coercive force and residual magnetization of the sintered magnet to decrease. This is because misaligned grains which are not aligned in the direction of the easy magnetization axis of the magnet grows abnormally.

Therefore, in the present embodiment, in the process of producing the R-T-B-based magnetic powder, a refractory metal sulfide is added to the R-T-B-based raw material to induce precipitation of the high-melting point metal, whereby the particle size of the synthesized magnet powder itself can be miniaturized and the homogeneity of the particles can be improved. At the same time, normal grain growth and abnormal grain growth during a sintering process can be suppressed, thereby improving magnetic properties and squareness ratio of the sintered magnet.

When sintering the magnetic powder produced by the reduction-diffusion method, the above-mentioned normal and abnormal grains are actively generated, so that the sintering temperature cannot be improved, and there is a limitation in improving the density.

When a refractory metal sulfide is added in the process of producing magnet powder as in the present embodiment, it is possible to effectively limit the grain growth in the sintering process as compared with the conventional case. Accordingly, it is possible to make the crystal grains finer and uniform, thereby manufacturing a sintered magnet with improved magnetic properties. In addition, the abnormal growth of the misaligned grain that is not aligned in the easy magnetization axis direction can be suppressed, the sintering temperature can be increased, the density of the sintered magnet can be improved, and the residual magnetization value can also be increased.

That is, in the embodiments of the present disclosure, the refractory metal sulfide can be added in the process of producing magnet powder to induce the reduction of the refractory metal sulfide during the reduction process, thereby forming a fine high-melting point metal precipitate. Through this, a homogeneous and fine R-T-B magnetic powder can be produced. By sintering the fine R-T-B-based magnet powder containing high-melting point metal precipitates, an R-T-B-based sintered magnet having excellent magnetic properties and squareness ratio can be manufactured. The high-melting point metal precipitate may be formed in the form of pure molybdenum (Mo), pure tungsten (W), molybdenum-iron alloy, tungsten-iron alloy, molybdenum-iron-boron alloy, or tungsten-iron-boron alloy. When pure molybdenum (Mo) or pure tungsten (W) is added during formation of these precipitates, due to the high melting point of the element, the particle size of the precipitated phase cannot be controlled, and thus a very large precipitate may be formed. However, when added in the form like sulfide, the sulfide is reduced in the reduction-diffusion process, so that fine and pure molybdenum (Mo) or tungsten (W) is formed, and this reacts with surrounding iron (Fe) or boron (B) to form the above-mentioned precipitates finely. Due to this, a more homogeneous and finer magnetic powder can be formed. In addition, due to the high-melting point metal precipitate formed during reduction-diffusion in the process of producing the magnetic powder, normal and abnormal grain growth is suppressed even during the sintering process, thereby improving residual magnetization and squareness ratio.

The manufacturing method of the sintered magnet according to the present embodiment may further include a step of producing a eutectic alloy containing Pr, Al, Cu, and Ga, and a step of infiltrating the eutectic alloy to the sintered magnet. The infiltration step may include a step of applying the eutectic alloy to the sintered magnet and a step of heat-treating the sintered magnet to which the eutectic alloy is applied.

First, the step of infiltrating the sintered magnet will be described in detail.

As a post-treatment method, the conventional grain boundary diffusion process (GBDP) or infiltration treatment uses heavy rare earth elements such as Tb and Dy, but there is the disadvantage in that the melting point is high, and thus there is a limit to the penetration into the magnet and the diffusion of grain boundaries, and also the cost is high. In contrast, in the present embodiment, since the surface of the sintered magnet is infiltrated using a eutectic alloy having a low melting point, grain boundary diffusion or penetration into the magnet can be performed more smoothly. Therefore, it is possible to efficiently improve the coercive force of the sintered magnet while minimizing the use amount of the heavy rare earth element or without using it.

In particular, the sintered magnet of the present disclosure can be manufactured by sintering the magnetic powder produced by a reduction-diffusion method. At this time, when sintering the magnetic powder produced by the reduction-diffusion method, in the process of sintering, grain growth (more than 1.5 times the size of the initial powder) or abnormal grain growth (more than twice the size of the normal grain size) may occur. Thus, there is a problem that the grain size distribution of the sintered magnet is not uniform, and magnetic performance such as coercive force or residual magnetization is deteriorated.

When the infiltration is performed using a eutectic alloy containing Pr, Al, Cu and Ga according to the present embodiment, it was confirmed that the coercive force was improved by about 8 kOe (kilo oersted). The coercive force has increased by about 30% to 70% compared to before infiltration, and even though heavy rare earth elements were not added, it shows a high improvement in coercive force in a level comparable thereto.

In particular, when the magnetic powder is produced by a reduction-diffusion method, it is possible to make the magnetic powder finer than the conventional method, whereby the sintered magnet manufactured by sintering the magnetic powder may be formed to have a somewhat low density. Therefore, when the target of the infiltration according to the present embodiment is a sintered magnet obtained by sintering magnetic powder by a reduction-diffusion method, due to the low density of the sintered magnet, the effect of grain boundary diffusion or the effect of improving coercive force may be more excellent.

The step of applying the eutectic alloy to the sintered magnet may include the steps of applying an adhesive material to the surface of the sintered magnet, dispersing the pulverized eutectic alloy in the adhesive material, and drying the adhesive material. This allows the eutectic alloy to be applied and attached to the surface of the sintered magnet. Meanwhile, the adhesive material may be a mixture of polyvinyl alcohol (PVA), ethanol, and water.

Then, the heat treatment step is followed. The heat treatment step may include a step of heating 500 to 1000 degrees Celsius. More specifically, the heat treatment step may include a first heat treatment step and a second heat treatment step. The first heat treatment step includes a step of heating to 800 to 1000 degrees Celsius, and may be performed for about 4 to 20 hours, and the secondary heat treatment step includes a step of heating 500 to 600 degrees Celsius, and may be performed for about 1 to 4 hours.

Through the first heat treatment step, melting of the eutectic alloy containing Pr, Al, Cu and Ga is induced, and the penetration into the sintered magnet can be smoothly performed.

Next, through the second heat treatment step, a phase transformation of the R-rich phase due to Pr, Al, Cu, Ga, etc. diffused into the sintered magnet can be induced, thereby making it possible to further improve the coercive force. Meanwhile, the eutectic alloy in the present embodiment includes Ga, and by infiltrating the eutectic alloy, a non-magnetic phase can be formed on the grain boundary of the sintered magnet.

Specifically, since the crystal grain of the R—Fe—B-based sintered magnet is much larger than the size of the single domain, and there is almost no histological change inside the grain, the coercive force depends on the ease of the reverse domain generation and movement at the grain boundary. In other words, when of the reverse domain generation and movement occur easily, the coercive force is low. If it is the opposite, the coercive force is high.

Because the coercive force of the R—Fe—B-based sintered magnet as described above is determined by the physical and histological characteristics at the grain boundary region, the coercive force can be improved by suppressing the reverse domain generation and movement at this region.

Thus, if Ga is applied to the eutectic alloy and then heat-treated as in the present embodiment, the nonmagnetic phase can be effectively formed at the grain boundaries of the sintered magnet. An $Nd_6Fe_{13}Ga$ phase may be formed due to the addition of Ga. Thereby, the Fe content in the Nd-rich phase is significantly reduced, and the nonmagnetic properties of the Nd-rich phase are improved. Finally, the residual magnetic flux density of the sintered magnet is maintained without deterioration, the coercive force is improved, and the effect of increasing magnetic performance can be obtained.

Further, Al and Cu added together may help to enhance the effect due to the addition of Ga as described above. Nonmagnetic Al and Cu are additionally penetrated onto Nd-rich phase whose Fe content has been drastically reduced due to the presence of Ga, thereby further improving the nonmagnetic properties of the Nd-rich phase and further increasing the coercive force.

Further, each of Al, Cu, and Ga can form eutectic reaction with Pr added together, thereby lowering the melting point of Pr. Thereby, the penetration of the eutectic alloy into the magnet can be further facilitated as compared with the case where the raw materials are not added.

Meanwhile, it is preferable that the content of Ga is 1 to 20 at % relative to the eutectic alloy. If the content of Ga is more than 20 at %, the R—Fe—Ga phase is excessively formed, which can adversely affect the magnetic performance of the sintered magnet. If the content of Ga is less than 1 at %, there is a problem that the nonmagnetic phase of the sintered magnet is not formed as much as intended, and thus, the effect of improving the coercive force is insufficient.

Next, the step of producing eutectic alloy used for the infiltration will be described.

The step of producing eutectic alloy may include the steps of mixing $PrH_2$, Al, Cu and Ga to prepare a eutectic alloy mixture, pressing the eutectic alloy mixture by a cold isostatic pressing method, and heating the pressed eutectic alloy mixture.

$PrH_2$, Al, Cu can be mixed in powder form, and Ga with a low melting point can be mixed in a liquid phase.

Thereafter that, the eutectic alloy mixture may be pressed by cold isostatic pressing (CIP).

The cold isostatic pressing is a process for uniformly applying pressure to the powder, and a process of encapsulating and sealing the eutectic alloy mixture in a plastic container such as a rubber bag, and then applying hydraulic pressure.

Thereafter, the step of heating the pressed eutectic alloy mixture may be followed. Specifically, the pressed eutectic alloy mixture is wrapped in a foil of Mo or Ta metal, and the temperature is raised to 300 degrees Celsius per hour in an inert atmosphere such as Ar gas, and heated to 900 degrees Celsius to 1050 degrees Celsius. The heating may be performed for about 1 hour to 2 hours.

After pulverizing the eutectic alloy thus produced, it can be used in the infiltration step described above.

The above-mentioned method has the advantage in that by pressing and agglomerating the above mixture and then immediately melting it, the eutectic alloy in which the component raw materials are uniformly distributed can be produced by a simple method.

On the other hand, in order to complement the improvement of the coercive force in the infiltration, $DyH_2$, that is, heavy rare earth hydride powder, may be further added to the eutectic alloy mixture, so that the eutectic alloy may further include Dy.

Then, more detail will be given for each step below.

First, the step of producing an R—Fe—B-based magnet powder by a reduction-diffusion method will be described. The production of the R—Fe—B-based magnetic powder according to the reduction-diffusion method includes the steps of synthesizing from a raw material and the cleaning step.

The step of synthesizing magnetic powder from raw materials may include the steps of mixing rare earth oxide, boron, iron and refractory metal sulfide to produce a first mixture, adding and mixing a reducing agent such as calcium to the first mixture to prepare a second mixture, and heating the second mixture to a temperature of 800 to 1100 degrees Celsius.

The rare earth oxide may include at least one of $Nd_2O_3$, $Pr_2O_3$, $Dy_2O_3$ or $Tb_2O_3$ as mentioned above, and the reducing agent may include at least one of Ca, $CaH_2$ or Mg. The refractory metal sulfide may include at least one of $MoS_2$ or $WS_2$.

The synthesis of the magnetic powder is a process of mixing raw materials such as rare earth oxides, boron, iron and refractory metal sulfide, reducing and diffusing the raw materials at a temperature of 800 to 1100 degrees Celsius to form a R—Fe—B alloy magnet powder.

Specifically, when the powder is produced from a mixture of rare earth oxide, boron, and iron, the molar ratio of rare earth oxide, boron, and iron may be between 1:14:1 and 2.5:14:1. Rare earth oxides, boron and iron are raw materials for producing $R_2Fe_{14}B$ magnet powder. When the molar ratio is satisfied, $R_2Fe14_B$ magnet powder can be produced in a high yield. If the molar ratio is less than 1:14:1, there is a problem that the composition of the $R_2Fe_{14}B$ main phase is deviated and the R-rich grain boundary phase is not formed. When the molar ratio is greater than 2.5:14:1, there may be a problem that the amount of rare earth elements is excessive and the reduced rare earth elements remain, and the remaining rare earth elements are changed to $R(OH)_3$ or $RH_2$.

The heating is for synthesis, and can be performed for 10 minutes to 6 hours at a temperature of 800 to 1100 degrees Celsius in an inert gas atmosphere. When the heating time is less than 10 minutes, the powder is not sufficiently synthesized, and when the heating time is more than 6 hours, there may be a problem that the size of the powder becomes coarse and the primary particles is agglomerated together.

The magnetic powder thus produced may be $R_2Fe_{14}B$. Further, the size of the produced magnetic powder may be 0.5 micrometers to 10 micrometers. Further, the size of the magnetic powder produced according to one embodiment may be 0.5 micrometers to 5 micrometers.

That is, $R_2Fe_{14}B$ magnet powder is formed by heating the raw material at a temperature of 800 to 1100 degrees Celsius, and the $R_2Fe_{14}B$ magnet powder is a neodymium magnet and exhibits excellent magnetic properties. Typically, in order to form the $R_2Fe_{14}B$ magnet powder such as $Nd_2Fe_{14}B$, the raw material is melted at a high temperature of 1500 to 2000 degrees Celsius, and then rapidly cooled to form lumps of raw materials, and these lumps are coarsely pulverized, hydrogen crushed, etc. to obtain a $R_2Fe_{14}B$ magnet powder.

However, in the case of this method, a high temperature for melting the raw material is required, and a process of cooling and then pulverizing the raw material is required, and the process time is long and complicated. Further, a separate surface treatment process is required in order to enhance the corrosion resistance and improve electric resistance for the coarsely pulverized $R_2Fe_{14}B$ magnet powder.

However, when R-T-B-based magnetic powder is produced by the reduction-diffusion method as in the present embodiment, raw materials are reduced and diffused at a temperature of 800 to 1100 degrees Celsius to form a $R_2Fe_{14}B$ magnet powder. In this step, since the size of the magnetic powder is formed in units of a few micrometers, no separate pulverization process is required.

Further, in the case of the process of obtaining a sintered magnet by sintering magnet powder later, the growth of crystal grain is necessarily accompanied when sintering is performed in the temperature range of 1000 to 1100 degrees Celsius. The growth of the crystal grain acts as a factor that reduces the coercive force. The size of the crystal grain of the sintered magnet is directly related to the size of the initial magnet powder, and therefore, if the average size of the magnetic powder is controlled to 0.5 micrometers to 10 micrometers as in the magnetic powder according to one embodiment of the present disclosure, a sintered magnet having an improved coercive force can be manufactured thereafter.

Further, it is possible to adjust the size of the alloy powder produced by adjusting the size of the iron powder used as the raw material.

However, when the magnetic powder is produced by this reduction-diffusion method, by-products such as calcium oxide or magnesium oxide may be generated in the manufacturing process, and a cleaning step for removing them is required.

In order to remove such by-products, a cleaning step of immersing the produced magnetic powder in an aqueous solvent or a non-aqueous solvent and cleaning it is followed.

This cleaning can be repeated two or more times.

The aqueous solvent may include deionized water (DI water), and the non-aqueous solvent may include at least one of methanol, ethanol, acetone, acetonitrile, or tetrahydrofuran.

On the other hand, in order to remove by-products, ammonium salt or acid may be dissolved in an aqueous solvent or a non-aqueous solvent. Specifically, at least one of $NH_4NO_3$, $NH_4Cl$, or ethylenediaminetetraacetic acid (EDTA) may be dissolved.

Thereafter, the step of sintering the R—Fe—B-based magnet powder that has undergone the synthesis step and the cleaning steps as described above is followed.

The R—Fe—B magnet powder to which the refractory metal sulfide is added and the rare earth hydride powder can be mixed and then sintered.

The rare earth hydride powder is preferably mixed in an amount of 4 to 10 wt % relative to the mixed powder.

When the content of the rare earth hydride powder is less than 4 wt %, there may be a problem that sufficient wettability between the particles is not imparted, so sintering is not performed well, and the role of inhibiting the decomposition of R—Fe—B main phase is not sufficiently performed. Further, when the content of rare earth hydride powder is more than 10 wt %, there may be a problem that the volume ratio of the R—Fe—B main phase in a sintered magnet decreases, the value of the residual magnetization is reduced, and particles are excessively grown by liquid phase sintering. When the size of the crystal grains increases due to overgrowth of the particles, it is vulnerable to magnetization reversal and thus, the coercive force is reduced.

Next, the mixed powder is heated at a temperature of 700 to 900 degrees Celsius. In this step, the rare earth hydride is separated into rare earth metal and hydrogen gas, and hydrogen gas is removed. That is, for example, when the rare earth hydride powder is $NdH_2$, $NdH_2$ is separated into Nd and $H_2$ gas, and $H_2$ gas is removed. That is, heating at 700 to 900 degrees Celsius is a process of removing hydrogen from the mixed powder. At this time, heating may be performed in a vacuum atmosphere.

Next, the heated mixed powder is sintered at a temperature of 1000° C. to 1100° C. At this time, the step of sintering the heated mixed powder at a temperature of 1000 to 1100 degrees Celsius may be performed for 30 minutes to 4 hours. This sintering step can also be performed in a vacuum atmosphere. More specifically, the mixed powder heated at 700 degrees to 900 degrees Celsius is placed in a graphite mold, compressed, and oriented by applying a pulsed magnetic field to produce a molded body for a sintered magnet. The molded body for sintered magnets is heat-treated at 300 to 400 degrees Celsius in a vacuum atmosphere, and then sintered at a temperature of 1000 to 1100 degrees Celsius to produce a sintered magnet.

In this sintering step, liquid phase sintering by rare earth elements is induced. That is, liquid sintering occurs by a rare earth element between the R—Fe—B magnet powder produced by the conventional reduction-diffusion method and the added rare earth hydride powder. Through this, the R-rich and $RO_x$ phases are formed in the grain boundary region inside the sintered magnet or the grain boundary region of the main phase grains of the sintered magnet. The R-rich region or $RO_x$ phase formed in this way improves the sintering capability of the magnetic powder and prevents decomposition of the main phase particles in the sintering process for manufacturing a sintered magnet. Therefore, the sintered magnet can be stably manufactured.

The manufactured sintered magnet has a high density, and the size of the crystal grains may be 1 micrometer to 10 micrometers.

Then, the method for manufacturing a sintered magnet according to the embodiment of the present disclosure will be described below with reference to specific examples and comparative examples.

Example 1: Addition of $MoS_2$ 14 g of $Nd_2O_3$, 26.1 g of Fe, 0.04 g of Cu, 1.2 g of Co, 0.44 g of B, 0.12 g of Al and 0.2 g of $MoS_2$ were uniformly mixed with 7.5 g of Ca and 0.6 g of Mg to prepare a mixture.

The mixture was placed in a frame of an arbitrary shape and tapped, and then the mixture was heated in an inert gas (Ar, He) atmosphere at 900 degrees Celsius for 30 minutes to 6 hours, and reacted in a tube electric furnace. After the reaction was completed, a ball mill process was performed with zirconia balls in a dimethyl sulfoxide solvent.

Next, a cleaning step was performed to remove Ca and CaO, which are reduction by-products. 30 g to 35 g of $NH_4NO_3$ was uniformly mixed with the synthesized powder, and put in ~200 ml of methanol, and homogenizer and ultrasonic cleaning were alternatively once or twice for effective cleaning. Next, in order to remove $Ca(NO)_3$, which is a reaction product of residual CaO and $NH_4NO_3$, with the same amount of methanol, the mixture was rinsed 2-3 times with methanol or deionized water. Finally, after rinsing with acetone, vacuum drying was performed to complete the cleaning, thereby obtaining single phase $Nd_2Fe_{14}B$ powder particles.

Thereafter, 5 to 10 wt % of $NdH_2$ powder was added to the magnetic powder, mixed, and then placed in a graphite mold and subjected to compression molding. The powder was oriented by applying a pulsed magnetic field of 5T or more to prepare a molded body for a sintered magnet. Thereafter, the molded body was heated in a vacuum sintering furnace at a temperature of 850 degrees Celsius for 1 hour, heated at a temperature of 1040 degrees Celsius for 2 hours, and sintered, thereby manufacturing a sintered magnet.

Example 2: Addition of $WS_2$ 14 g of $Nd_2O3$, 26.1 g of Fe, 0.04 g of Cu, 1.2 g of Co, 0.44 g of B, 0.12 g of Al and 0.16 g of $WS_2$ were uniformly mixed with 7.5 g of Ca and 0.6 g of Mg to prepare a mixture. Thereafter, a sintered magnet was manufactured in the same manner as in Example 1.

Comparative Example 1: No Addition of Refractory Metal Sulfide

A sintered magnet was manufactured in the same manner as in Example 1 from the same raw material as in Example 1, except that in the process of producing the magnetic powder, the magnetic powder was produced without adding refractory metal sulfide to the raw material of the magnetic powder and sintering was performed.

Example 3: Addition of $MoS_2$+Infiltration

After the sintered magnet was manufactured in the same manner as in Example 1, the following infiltration was added.

First, for the production of eutectic alloys, 88.4 g of $PrH_2$, 4.7 g of Al, 5.6 g of Cu, and 3.1 g of liquid Ga were mixed to prepare an eutectic alloy mixture, and the mixture was agglomerated by cold isostatic pressing. That is, the eutectic alloy mixture was sealed in a plastic container and sealed, and then hydraulic pressure was applied. Thereafter, the mixture was wrapped in Mo or Ta metal foil, and the temperature was raised to 300 degrees Celsius per hour in an inert atmosphere such as Ar gas and heated to 900 degrees Celsius to 1050 degrees Celsius. The heating can proceed for about 1 hour to 2 hours. Finally, the produced eutectic alloy was pulverized into a size suitable for infiltration. The eutectic alloys thus produced are 66.7 at % of Pr, 19 at % of Al, 9.5 at % of Cu, and 4.8 at % of Ga.

Finally, the step of infiltrating the sintered magnet was performed. An adhesive material in which polyvinyl alcohol (PVA), ethanol, and water were mixed was applied to the surface of the manufactured sintered magnet. The pulverized eutectic alloy was dispersed on the surface of the sintered magnet in an amount of 1 to 10% by mass compared to the sintered magnet, and then the adhesive material was dried using a heating gun or oven to allow the eutectic alloy to well adhere to the surface of the sintered magnet.

For the first heat treatment, these sintered magnets were heated in a vacuum at 800 to 1000 degrees Celsius for 4 to 20 hours. Next, for the second heat treatment, they were heated at 500° C. to 600° C. for 1 hour to 4 hours.

Example 4: Addition of $WS_2$+Infiltration

After manufacturing the sintered magnet in the same manner as in Example 2, the infiltration described in Example 3 was added.

Evaluation Example 1: Measurement of Coercive Force and Squareness Ratio

The coercive force and magnetic flux density of the sintered magnets manufactured according to Comparative Example 1, Example 1, and Example 2 were measured and shown in FIG. 1.

Referring to FIG. 1, the residual magnetization of Comparative Example 1 was 1.15 T, whereas the residual magnetization of Examples 1 and 2 was greatly improved to 1.3 T, and Examples 1 and 2 had an excellent squareness ratio as compared with Comparative Example 1.

Next, in the process of manufacturing a sintered magnet according to Comparative Example 1, the coercive force and magnetic flux density of the sintered magnet before and after the infiltration step were measured and shown in FIG. 2, and in the process of manufacturing the sintered magnet according to Example 3, the coercive force and magnetic flux density of the sintered magnet before and after the infiltration step were measured and shown in FIG. 3.

Referring to FIG. 2, in Comparative Example 1, when the infiltration was performed in the sintering step, the squareness ratio of the sintered magnet can be lowered. On the other hand, referring to FIG. 3, when the infiltration was performed in Example 3, it can be confirmed that even though the coercive force is improved, the squareness ratio does not decrease.

Evaluation Example 2

A scanning electron microscope image of the sintered magnet manufactured according to Comparative Example 1 is shown in FIG. 4, a scanning electron microscope image of the sintered magnet manufactured according to Example 1 is shown in FIG. 5, and the scanning electron microscope image of the sintered magnet manufactured according to Example 2 is shown in FIG. 6.

Referring to FIG. 4, a crack occurred in the magnetic powder contained in the sintered magnet, and the size is also very large and heterogeneous. In contrast, referring to FIGS. 5 and 6, it can be confirmed that the surface of the magnetic powder contained in the sintered magnet is clean, the particle distribution is uniform, and the individual size is also reduced.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

The invention claimed is:

1. A method for manufacturing a sintered magnet, comprising:

producing an R-T-B-based magnetic powder through a reduction-diffusion method;

sintering the R-T-B-based magnetic powder to form a sintered R-T-B-based magnet;

producing an eutectic alloy containing Pr, Al, Cu, and Ga; and infiltrating the eutectic alloy to the sintered R-T-B-based magnet, wherein R is a rare earth element, and T is a transition metal, wherein the producing the R-T-B-based magnetic powder includes:

adding a refractory metal sulfide powder to a R-T-B-based raw material, wherein the infiltration includes:

applying the eutectic alloy to the sintered R-T-B-based magnet, and heat-treating the sintered R-T-B-based magnet to which the eutectic alloy is applied, and wherein producing the eutectic alloy includes:

mixing $PrH_2$, Al, Cu and Ga to prepare an eutectic alloy mixture, pressing the eutectic alloy mixture by a cold isostatic pressing method, and heating the pressed eutectic alloy mixture.

2. The method according to claim 1, wherein R is Nd, Pr, Dy or Tb, and T is Fe.

3. The method according to claim 1, wherein the refractory metal sulfide powder includes at least one of $MoS_2$ or $WS_2$.

4. The method according to claim 1, wherein in the producing the R-T-B-based magnetic powder, the refractory metal sulfide powder is reduced to form a metal precipitate.

5. The method according to claim 4, wherein in the sintering the R-T-B-based magnetic powder, the R-T-B-based magnetic powder is sintered in the presence of the metal precipitate.

6. The method according to claim 1, wherein the sintering the R-T-B-based magnetic powder includes adding a rare earth hydride powder to the R-T-B-based magnet powder.

7. The method according to claim 6, wherein the rare earth hydride powder includes at least one of $NdH_2$, $PrH_2$, $DyH_2$ or $TbH_2$.

8. The method according to claim 1, wherein the producing the R-T-B-based magnetic powder includes mixing a rare earth oxide, iron, boron, and a reducing agent, followed by heating.

9. The method according to claim 8, wherein the reducing agent includes at least one of Ca, $CaH_2$ or Mg.

* * * * *